(12) United States Patent
Murray et al.

(10) Patent No.: US 9,271,447 B2
(45) Date of Patent: Mar. 1, 2016

(54) SYSTEM FOR FLEXIBLE CROP RESIDUE MANAGEMENT

(71) Applicant: CNH America LLC, New Holland, PA (US)

(72) Inventors: Craig E. Murray, Davenport, IA (US); Justin L. Montenguise, Bettendorf, IA (US); Nicholas S. Shane, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 181 days.

(21) Appl. No.: 13/934,334

(22) Filed: Jul. 3, 2013

(65) Prior Publication Data

US 2015/0011275 A1    Jan. 8, 2015

(51) Int. Cl.
*A01F 12/30* (2006.01)
*A01F 12/00* (2006.01)
*A01D 41/12* (2006.01)

(52) U.S. Cl.
CPC ............ *A01F 12/00* (2013.01); *A01D 41/1243* (2013.01)

(58) Field of Classification Search
CPC .................................................. A01D 41/1243
USPC .................................................. 460/111, 112
See application file for complete search history.

(56) References Cited

U.S. PATENT DOCUMENTS

| | | | |
|---|---|---|---|
| 6,572,035 B1 * | 6/2003 | Pfeiffer | 239/650 |
| 6,736,721 B2 * | 5/2004 | Niermann et al. | 460/112 |
| 6,881,145 B2 * | 4/2005 | Holmen | 460/112 |
| 6,908,379 B2 * | 6/2005 | Gryspeerdt et al. | 460/111 |
| 7,156,732 B2 | 1/2007 | Kuhn et al. | |
| 7,220,179 B2 | 5/2007 | Redekop et al. | |
| 7,556,227 B2 * | 7/2009 | Thuelig | 248/188.8 |
| 7,918,721 B2 | 4/2011 | Hoskinson et al. | |
| 8,585,475 B2 | 11/2013 | Isaac et al. | |
| 2003/0017861 A1 * | 1/2003 | Niermann et al. | 460/112 |
| 2005/0282602 A1 * | 12/2005 | Redekop et al. | 460/112 |
| 2014/0066147 A1 | 3/2014 | Dilts et al. | |

FOREIGN PATENT DOCUMENTS

DE    10 2006 042 970 A1    4/2008
DE    10 2008 040 137 A1    2/2009

* cited by examiner

*Primary Examiner* — Thomas B Will
*Assistant Examiner* — Joan D Misa
(74) *Attorney, Agent, or Firm* — Patrick M. Sheldrake

(57) ABSTRACT

An agricultural harvester with a flexible crop residue management system. A pivotal swath door and displaceable windrow chute are coordinated to be displaced between positions in which all of crop residue is spread laterally and another position in which straw in the crop residue is directed in a windrow by a windrow chute and the chaff is directed laterally.

15 Claims, 4 Drawing Sheets

SYSTEM FOR FLEXIBLE CROP RESIDUE MANAGEMENT

BACKGROUND OF THE INVENTION

1. Field of the Invention

The present invention relates to agricultural harvesters such as combines, and, more particularly, to crop residue systems used in such combines.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge straw, chaff and other debris toward the rear of the combine.

During the process of harvesting, crop material other than grain (MOG) is intended to be expelled from the combine. This material is usually derived from one of two areas, the threshing rotor or the cleaning system. The material expelled from the threshing rotor is generally referred to as straw and the material expelled from the cleaning system is generally referred to as chaff. This crop residue can be dealt with in several ways, generally categorized as spread and windrowed.

Spread refers to using a mechanical device to distribute the straw and/or chaff evenly across the width of the combine header cut width. This spread material is usually chopped to as short a length as possible so that when it is spread it will break down as quickly as possible and not interfere with tillage or seeding operations.

Windrowing refers to the process of dropping straw directly behind the combine in a continuous stream. The purpose of doing this is usually to allow post harvest processing of the straw such as shaping it into bales. In this process, the straw is usually allowed to pass through the combine with as little interference as possible so that it remains as close as possible to its original length and condition.

Many harvester systems have two separate spreading systems, one of which is dedicated to spreading the chaff from the cleaning system and another dedicated to spreading the straw from the rotor. These systems can be operated independent of one another. Currently, in order to windrow straw discharged from the rotor, the spreader disks normally used to spread the crop residue, must be removed from the machine and stored elsewhere since there is little available storage on the combine. Besides having to remove the disks, there is an absence of a device to slow the velocity of the straw before it hits the ground. This causes the straw to be driven into the stubble and makes it very difficult to return and pick up later. While windrowing straw, many operators prefer to spread chaff from the cleaning system which requires the use of a secondary spreader on the machine.

What is needed in the art therefor is a system allowing for flexible distribution of crop residue from a combine without modifications to the equipment.

SUMMARY OF THE INVENTION

The present invention provides a system for crop residue management that provides flexibility in the treatment of the material making up the crop residue.

The invention, in one form, is a crop residue management system for flexible distribution of straw and chaff contained within the crop residue. The system includes a pair of laterally spaced spreader devices for distributing crop residue laterally. A duct is provided for directing a crop residue stream to the spreader devices in a downward direction toward the laterally spaced spreader devices and a windrow chute is displaceable between a first position in which the windrow chute is out of the crop residue stream and a second position in which it directs straw in the residue stream in a windrow behind the system and directs chaff laterally.

In another form, the invention is an agricultural combine including a crop processing apparatus separating crop material from crop residue containing straw and chaff and for discharging crop residue therefrom in a stream. A duct is provided for directing a stream of crop residue material downstream in the combine in a generally downward direction. Laterally spaced spreader devices are positioned downstream of and below the duct for distributing crop residue laterally. A windrow chute is displaceable between a first position in which it is out of the crop residue stream permitting lateral distribution of both straw and chaff and a second position in which it directs straw in the residue stream in a windrow behind the agricultural combine and directs chaff laterally from the combine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
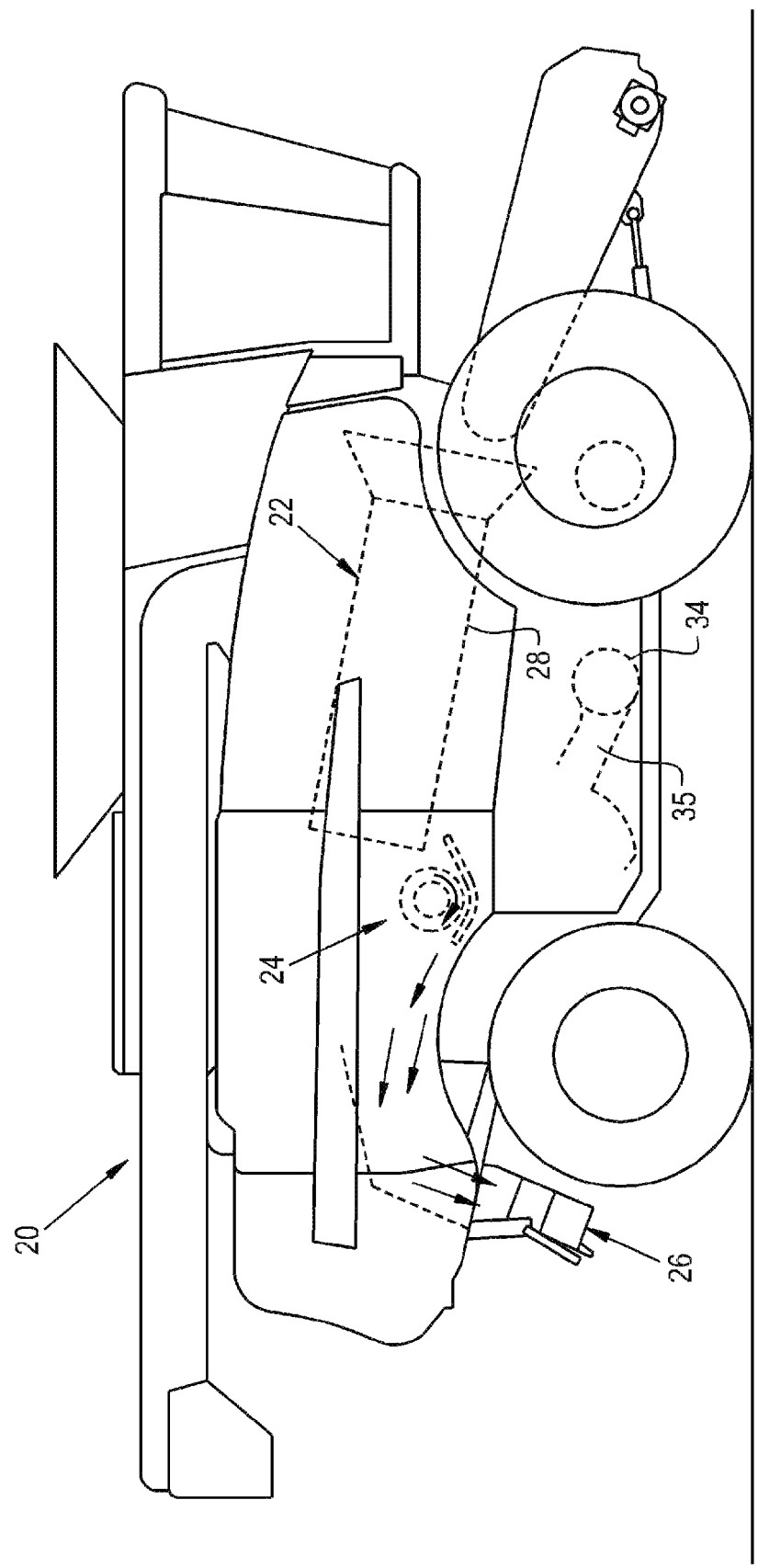
FIG. 1 is a side view of an embodiment of an agricultural harvester in the form of a combine which may include a crop residue system of the present invention.

FIG. 1 shows an agricultural combine 20 which includes the usual harvesting apparatus (not all of which is shown to facilitate an understanding of the invention). An axially oriented crop processing system 22 receives harvested crop and a crop residue treatment and distribution system 24 with a crop residue spreader 26 is positioned at the aft end of combine 20. The crop processing system includes a cylindrical threshing rotor 28 that conveys a flow of crop material in a helical flow path. As the crop material is moved through the processing apparatus 22, the desired crop such as grain or other material is loosened and separated from crop residue such as husk and pods in a cleaning system located beneath the threshing rotor 28. The crop processing system 22 includes a blower 34, schematically depicted to aid in the separation of the desired crop from the crop residue. The blower 34 has a duct 35 extending aft in the combine 20 towards the cleaning system and the crop residue treatment and distribution system 24.

As pointed out, current crop residue spreading systems have required the need of in the field modifications to the harvester or added equipment to enable the flexibility of either distributing all the residue laterally or separating the straw into a windrow and the chaff laterally. In accordance with the present invention, the crop residue spreader system 26 shown in FIGS. 2-5 is employed.

Figure 2:
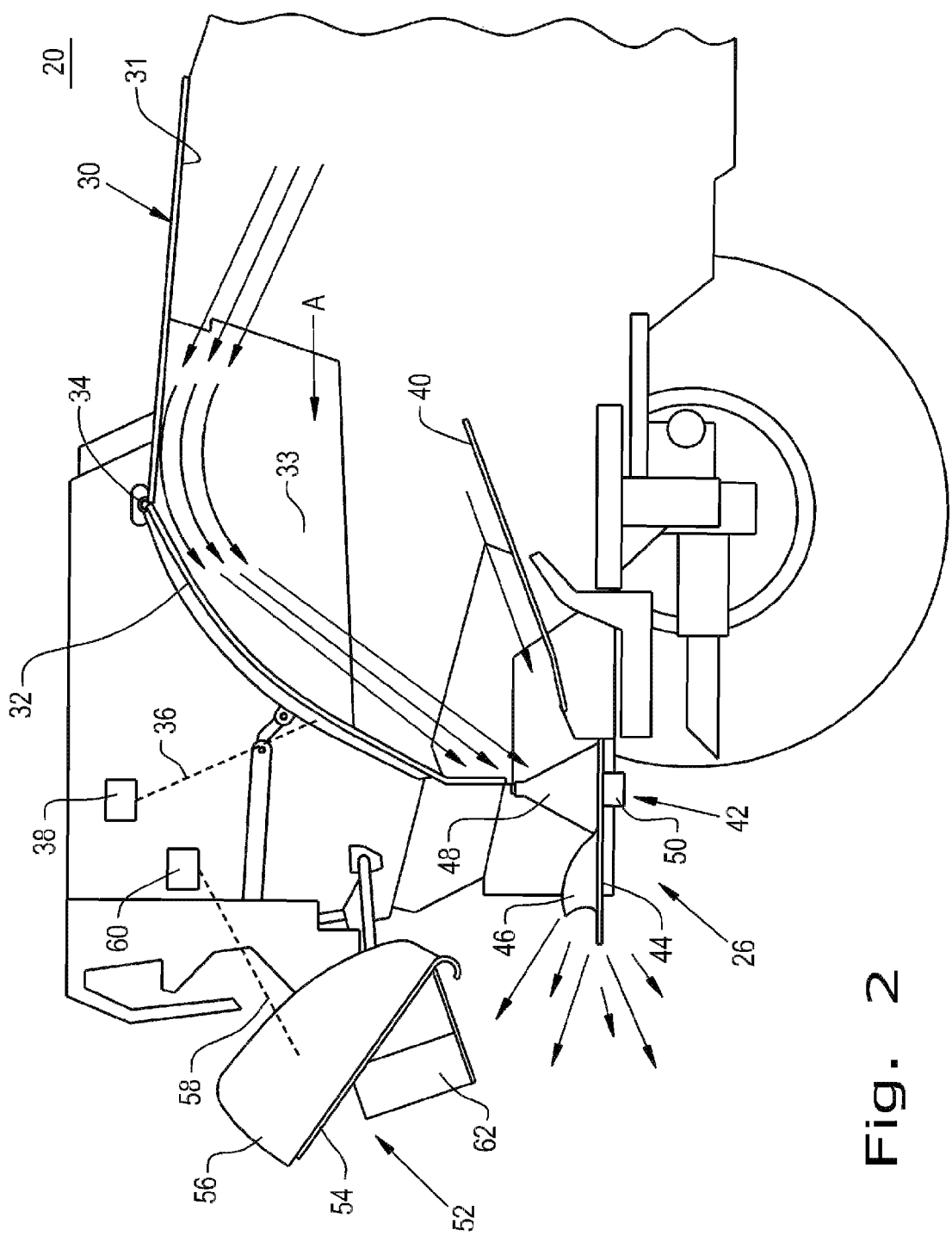
FIG. 2 is a side view in section of the agricultural of the agricultural harvester of FIG. 1 showing a first position in which crop residue is distributed laterally.

Specifically referring to FIG. 2, the crop residue spreader system comprises a duct 30 including a top wall 31 and sidewalls 33 to direct crop residue in an aft direction A. A swath door 32 spans the sidewalls of the duct 30 and is pivotally mounted at 34 to be displaced between the position shown in FIG. 2 to the position shown in FIG. 3. As shown in schematic fashion, the swath door 32 is displaced by a mechanical interconnection 36 to an actuating mechanism 38, both shown in schematic fashion. Although many different elements may be used to displace swath door 32 between its positions, the mechanism described in co-pending application entitled Linkage for Flexible Crop Residue Management System, of common assignment with the present invention, is preferred. A fixed floor 40 directs the crop residue stream towards a pair of spreader devices 42.

Spreader devices 42 include side-by-side disks 44 journaled for rotation about vertical axis and positioned laterally with respect to one another. Disks 44 may have a plurality of curved bats 46 that act like vanes to positively direct crop residue in a lateral direction. A cone 48 extends vertically upward from disk 44 and provides a cover for a motor 50 for each disk. The motor output shafts (not shown) cause the disks 44 to rotate as needed. Although motor 50 is illustrated as hydraulic, it may be in any one of a number of forms including mechanical interconnection to a remotely positioned motor. Rotation of disks 44 is set up so that when viewed from above and looking towards the front of the combine 20, the right side disk rotates counterclockwise and the left disk rotates clockwise so that they propel crop residue between them aft and around and laterally.

In the position illustrated in FIG. 2, both the straw and chaff are directed aft in direction A and are deflected downward by swath door 32 to impact on the disks 44 and curved bats 46. The rotation of the disks 44 causes the material to be distributed aft and laterally of the combine 20.

In accordance with the present invention, a windrow chute generally indicated at 52 is provided. Windrow chute includes a bottom portion 54 and adjacent sidewalls 56. Bottom portion 54 is tapered in a rearward direction as particularly shown in FIG. 4. Windrow chute 52 is displaceable between the position illustrated in FIG. 2 in which it is out of the crop residue stream and the position illustrated in FIG. 3. Windrow chute 52 is displaced by a mechanical connection 58 leading to an actuator 60. While many forms of mechanical connections and actuators may be employed for this purpose, the apparatus referred to in the above identified co-pending application is referenced and is hereby included in its entirety. Windrow chute 52 additionally includes deflectors 62 and 64 fixed to and projecting downwardly from bottom portion 54. As particularly shown in FIG. 5, deflectors 62 and 64 are curved to conform to the circumference of horizontal spreader disks 44.

In the positions shown in FIG. 2, the windrow chute 52 is in its first position in which it is positioned out of the crop residue stream and the swath door 32 is in its first lowered position in which it directs all of the crop residue stream towards the spreading devices 26.

Figure 3:
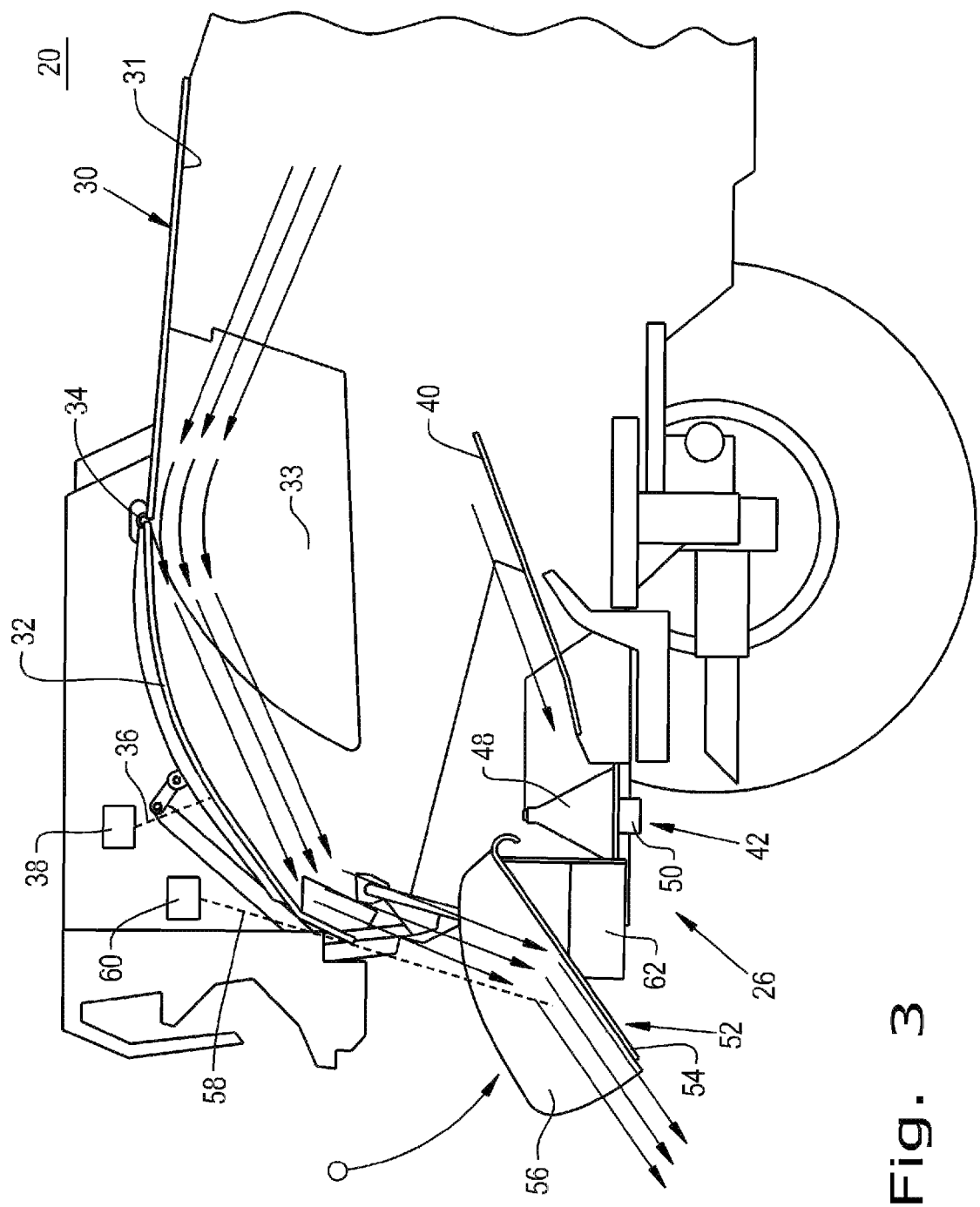
FIG. 3 is a side section view of the harvester of FIG. 1 showing the crop residue in a position for windrowing straw and laterally distributing chaff.
Figure 4:
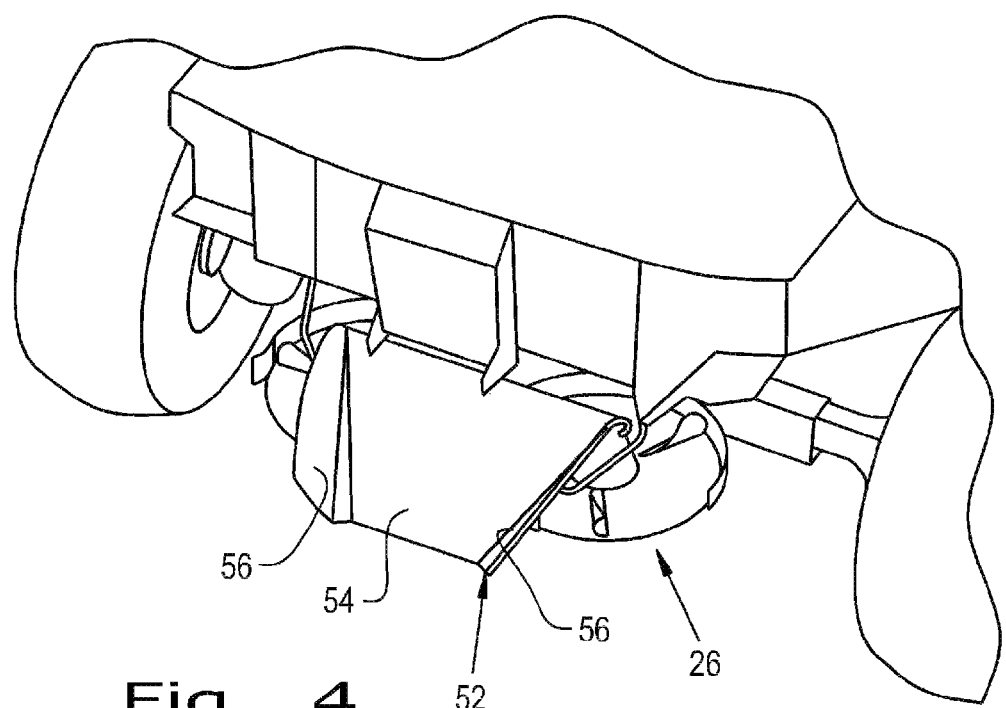
FIG. 4 is a perspective view of the elements of the crop residue management system of FIGS. 2-3 from an upper view.
Figure 5:
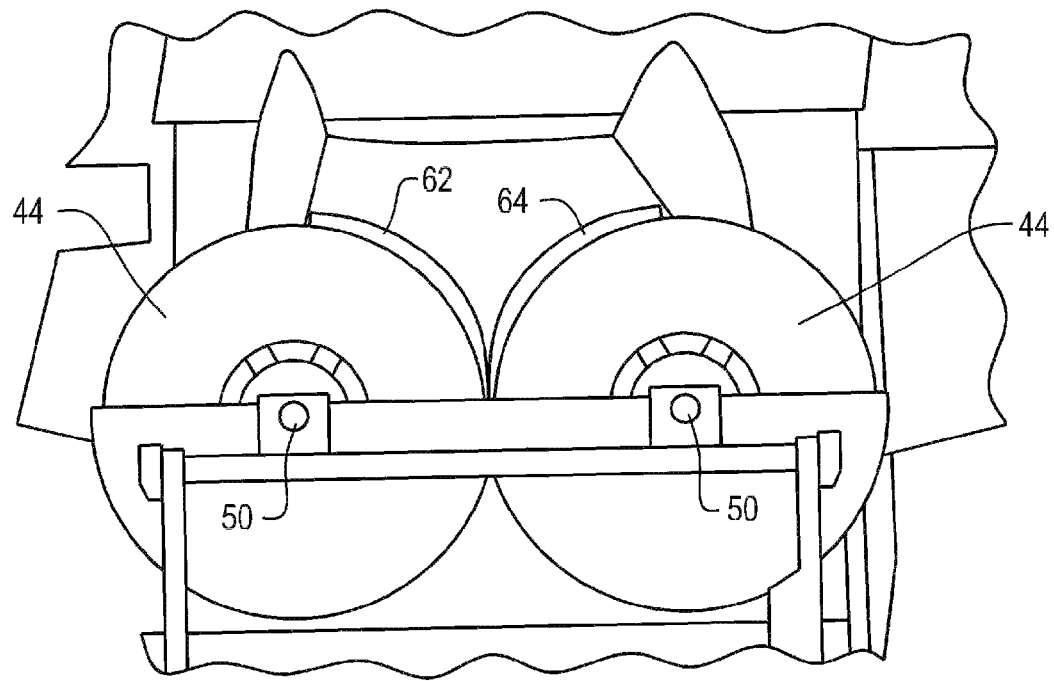
FIG. 5 is a view of the same section of the crop residue management system taken from a lower view.

As shown in FIG. 3, the swath door 30 may be pivoted by the actuator 38 to the illustrated second position in which it is elevated and does not direct all of the crop residue stream towards the spreading devices 26. At the same time, the actuator 60 displaces the windrow chute 52 to the illustrated second position in which it is in the crop residue stream. In the crop residue stream, the straw tends to be elevated and as such is directed downward to the windrow chute 52 and the impact slows the velocity of the straw. In addition, the convergence of the windrow chute enables a better formed windrow of straw which is directed downstream of the combine 20. At the same time, the chaff in the crop residue stream falls to the residue spreader system 26 and the deflectors 62 and 64 keep the air flow from the disks 44 out of the windrow for the straw so that it does not disturb the proper positioning in the field. The chaff in this condition is spread laterally.

The actuators 38 and 60 are coordinated to place the swath door and windrow chute 52 in their respective positions in coordinated interdependent fashion. The actuators may be implemented in a way that it is done by control from an operator of the harvester. This feature allows minimal time to change the configuration of the harvester from a spreading operation to an operation in which straw is windrowed and chaff is spread laterally across the field. This enables significant increases in operator efficiency and harvesting effectiveness.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A crop residue management apparatus for flexible distribution of straw and chaff contained within the crop residue, said apparatus comprising:
   a pair of laterally spaced spreader devices for distributing a crop residue laterally;
   a duct for directing a crop residue stream to said spreader devices in a downward direction toward said laterally spaced spreader devices; and,
   a swath chute displaceable between a first position in which the swath chute is out of the crop residue stream and a second position in which it directs straw in the residue stream in a windrow behind said apparatus and directs chaff laterally, wherein the swath chute has a bottom portion converging in a downstream direction and sidewalls extending from the bottom section; and
   a deflector connected to the bottom of the bottom portion to deflect chaff from the spreaders in a lateral direction wherein the spreader devices are circular disks and the deflector extending from the bottom of the bottom portion is curved to conform to the curving of the disks.

2. The apparatus of claim 1, in which the spreader devices are disks spaced laterally from one another and rotatable about a vertical axis.

3. The apparatus of claim 2, in which the spreaders disks have bats positioned on the upper surface of the disks for directing crop residue radially outward.

4. The apparatus of claim 2, having motors positioned below the disks and connected thereto for driving them in rotation.

5. The apparatus of claim 4, in which the motor is a hydraulic motor.

6. The apparatus of claim 1, in which the duct includes a first wall section extending generally horizontally with respect to the spreader disks and an adjacent downstream swath door curved in a downward direction, the duct having generally vertically extending sidewalls.

7. The apparatus of claim 6, wherein the swath door is pivotable between two positions, a first and lower position corresponding to the first position of the windrow chute and a second upper position corresponding to the second position of said windrow chute.

8. The apparatus of claim 1, in which the sidewalls extend outward from the bottom section at an outwardly extending angle.

9. An agricultural combine comprising:
   a crop processing apparatus separating crop material from crop residue and for discharging crop residue therefrom;
   a duct for directing a stream of crop residue downstream in said agricultural combine in a generally downward direction comprising a moveable swath door forming a rear wall between side walls of the chute and movable between at least a closed first position forming a generally closed path to a pair of laterally spaced spreader devices and a second raised position creating an opening for a crop residue steam from the combine between a lower portion of swath door and an upper portion of the pair of laterally spaced spreader devices;
   the pair of laterally spaced spreader devices positioned downstream of and below the duct for distributing crop residue laterally when the swath door is in a first position; and
   a windrow chute displaceable between a raised first position in which the windrow chute is rearward of and above a lower edge of the swath door generally out of contact with the crop residue stream and a second lower position in which the windrow chute is located generally below the opening formed when the swath door is in the second position and above the laterally spaced spreader devices for directing straw in the residue stream in a windrow behind the agricultural combine and directs chaff laterally from the combine.

10. The agricultural combine of claim 9, in which the spreading devices are circular disks rotatable about vertical axes.

11. The agricultural combine of claim 9, in which the duct has a substantially horizontal wall section and the downstream swath door extending downwardly toward the spreading devices.

12. The agricultural combine of claim 9, in which the windrow chute has a bottom portion converging in a downstream direction and sidewalls extending from the bottom portion.

13. The agricultural combine of claim 12, in which the sidewalls extend from the bottom portion at an outwardly extending angle.

14. The agricultural combine of claim 13, in which the windrow chute has a deflector mounted to flat tapered bottom portion to deflect chaff from the spreaders.

15. The agricultural combine of claim 14, in which the spreader devices are disks having circular circumference and the deflector is curved to conform to the circumference of the disks.

* * * * *